United States Patent [19]
Horiuchi et al.

[11] Patent Number: 5,790,294
[45] Date of Patent: Aug. 4, 1998

[54] LINE MONITORING METHOD AND LINE MONITORING APPARATUS

[75] Inventors: Yukio Horiuchi, Niza; Shu Yamamoto, Shiki; Shigeyuki Akiba, Tokyo, all of Japan

[73] Assignee: Kukusai Denshin Denwa Kabushiki Kaisha, Tokyo, Japan

[21] Appl. No.: 617,615

[22] Filed: Mar. 19, 1996

[30] Foreign Application Priority Data

Mar. 20, 1995 [JP] Japan ................... 7-085953

[51] Int. Cl.⁶ ................... H04B 10/02; H04B 10/16
[52] U.S. Cl. ................... 359/177; 359/110; 359/166; 359/179; 370/249
[58] Field of Search ................... 359/110, 143, 359/166, 177, 179, 173; 370/249; 455/9

[56] References Cited

U.S. PATENT DOCUMENTS

| | | | |
|---|---|---|---|
| 4,727,601 | 2/1988 | Konishi ................... | 359/166 |
| 5,296,957 | 3/1994 | Takahashi et al. ................... | 359/177 |
| 5,436,746 | 7/1995 | Hirst ................... | 359/110 |
| 5,500,756 | 3/1996 | Tsushima et al. ................... | 359/177 |

FOREIGN PATENT DOCUMENTS

| | | | |
|---|---|---|---|
| 3201375 | 7/1983 | Germany ................... | 359/166 |
| 0135140 | 5/1989 | Japan ................... | 359/166 |
| 3258037 | 11/1991 | Japan ................... | 359/177 |

*Primary Examiner*—Kinfe-Michael Negash
*Attorney, Agent, or Firm*—Pollock, Vande Sande & Priddy

[57] ABSTRACT

A line monitoring apparatus which features a simple configuration is capable of quickly detecting a position where a failure has occurred. A main track signal on an up-stream optical transmission path is set for a different wavelength from that on a down-stream optical transmission path, so that the wavelength of loopback signals fed back from repeaters does not overlap the wavelength of the main track signals transmitted from a transmitting terminal station. This makes it possible to separate the main track signals and the loopback signals by using dividing circuits at receiving terminal stations. In addition, the level of the separated loopback signals can be set higher than that in the past; therefore, a monitoring signal can be quickly detected in the loopback signal.

11 Claims, 9 Drawing Sheets

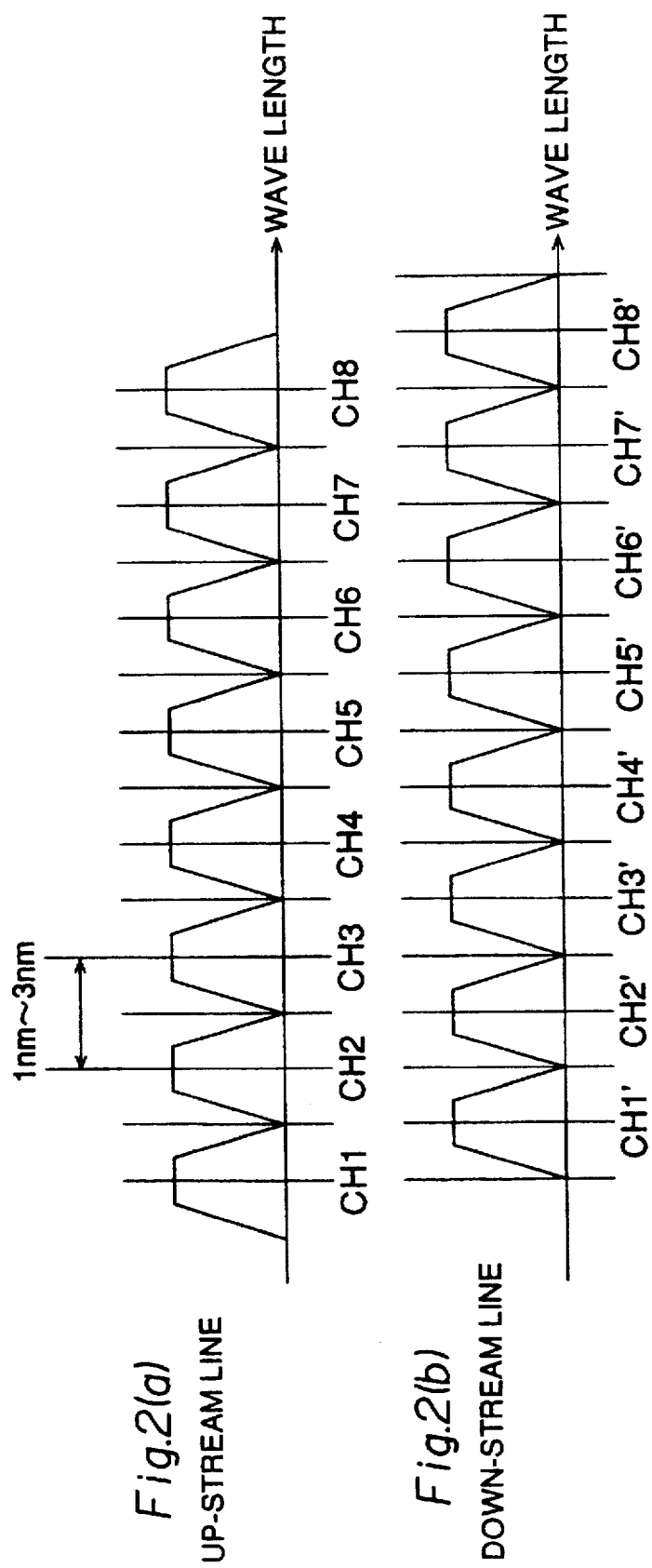

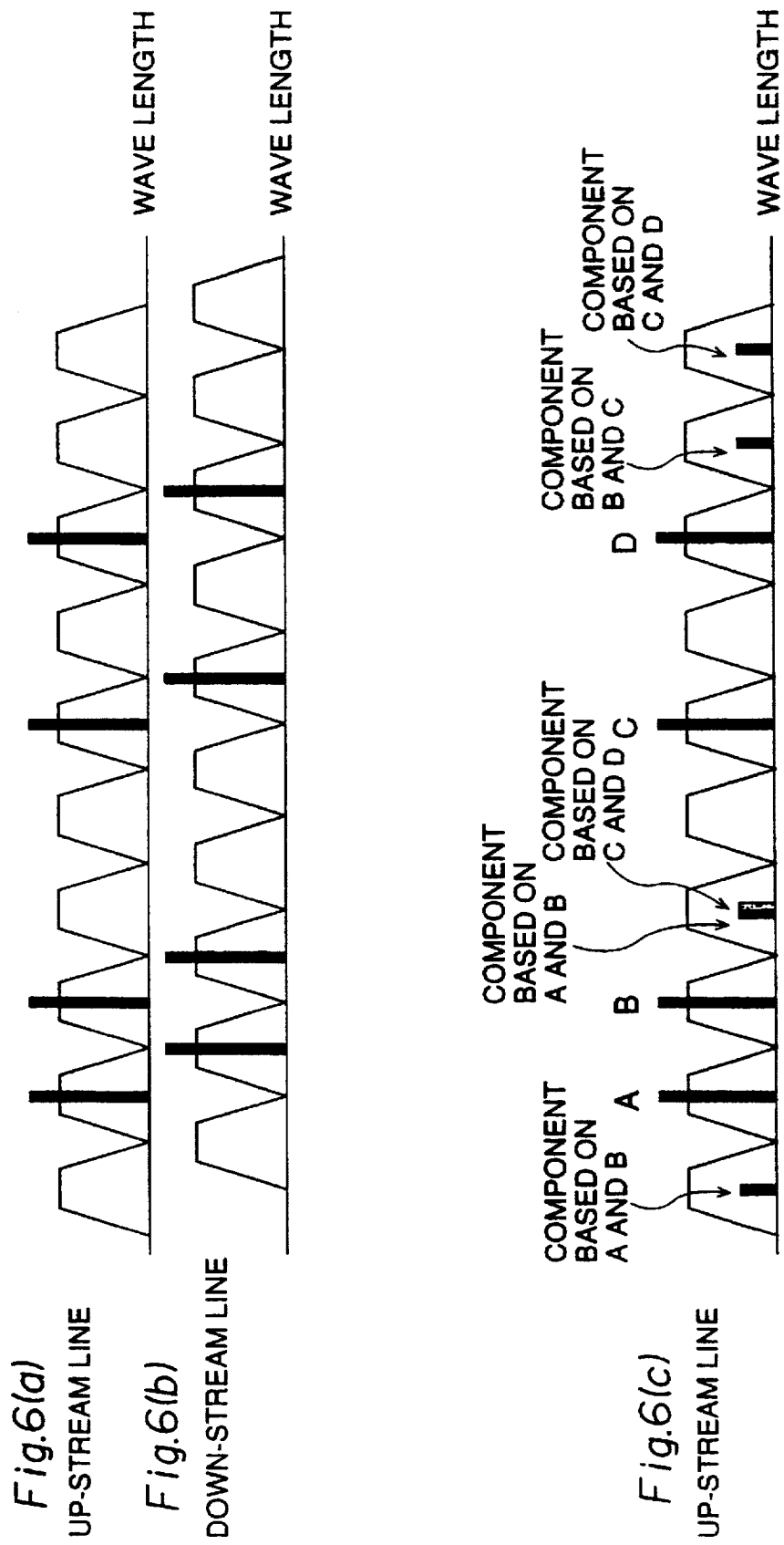

LINE MONITORING METHOD AND LINE MONITORING APPARATUS

BACKGROUND OF THE INVENTION

1. Field of the Invention

The present invention relates to a line monitoring method and a line monitoring apparatus in an optical amplification transmission system for transmitting optical signals by employing at least a pair of up-stream and down-stream optical fibers for transmission paths and by installing an optical repeater having an optical amplifier for amplifying an optical signal, which propagates through the pair of optical fibers, at each predetermined distance.

2. Description of the Prior Art

An optical communication system which employs optical fibers is adopted for a long-distance transmitting system such as an optical submarine cable. Such an optical submarine cable has an enormous transmission capacity; thus, a failure thereof would significantly affect information society, meaning that quick recovery is vital.

Most optical submarine cable systems are generally constituted by optical repeaters and optical cables. There are possibilities in that the cables are damaged during human activities including fishing and anchoring and that the optical repeaters incur failures in electric circuits thereof. To achieve quick recovery from the aforesaid problems, it is important to accurately locate the points of failures in the optical cables and/or the repeaters.

Hitherto, the optical communication systems use a regenerative relay system wherein an optical signal which propagates through the optical fibers is converted, in a repeater, to an electric signal which is then subjected to waveform shaping and regenerative processing before it is converted back to an optical signal and sent out. In recent years, an optical amplification relay transmission system has been developed which is designed to directly optically amplify an optical signal propagated through an optical fiber and send it out.

There has been known an optical loopback method (see, for example, Japanese Patent Laid-Open No. 6-204949) as the line monitoring method which makes use of the direct optical amplification of an optical signal without the regenerative relay processing, which is one of the characteristics of the aforesaid optical amplification relay transmission system.

This method makes it possible to detect a relay section, where a failure has taken place, by feeding back monitoring loopback signals from optical repeaters via transmission paths at all times. The optical loopback method will be described with reference to FIG. 7. The optical loopback method is designed to enable the detection of a failure point of a repeater or an optical fiber between repeaters by feeding back an optical signal, which propagates one of the pair of transmitting paths and on which a monitoring signal is superimposed, as a loopback signal, which has been attenuated by a predetermined amount, through the other transmitting path.

The optical amplification relay transmission system shown in FIG. 7(a) includes: optical repeaters 3a through 3n which are installed at predetermined distance intervals of optical fiber transmission paths 7 and 8; optical amplifiers 4a through 4n and 5a through 5n provided in the optical repeaters 3a through 3n; the optical fiber transmission path 7 constituting an up-stream line; the optical fiber transmission path 8 constituting a down-stream line; and a loopback circuit comprised of 9a through 9n.

In the optical amplification relay transmission system thus configured, the transmitting equipment at each terminal station, which is not shown, sends out optical signals comprised of transmission signal with the monitoring signals superimposed thereon to the up-stream and down-stream transmission paths 7 and 8. The respective optical signals sent out to the up-stream and down-stream transmission paths 7 and 8 are repeatedly subjected to optical amplification through the respective optical repeaters 4a through 4n and 5a through 5n before they are supplied to the associated receiving equipment at the terminal stations which are not shown. The propagated optical signals are attenuated by a predetermined amount via the loopback circuits 9a through 9n provided in the respective optical repeaters 3a through 3n, then propagated through the associated optical fiber transmission paths 8 and 7 before they are returned to the receiving equipment at the respective transmitting terminal stations.

FIG. 7(b) shows the details of the optical repeater 3. The optical signal which has propagated through the optical fiber transmission path 7 is amplified through an amplifier 4 and sent out to the optical fiber transmission path 7 via a first optical coupler 91, thereby being propagated to an optical repeater in the next stage. The optical signal which has been attenuated and branched by the first optical coupler 91 is further attenuated by a first attenuator 94 before it is applied to a second optical coupler 92. The optical signal is further attenuated by the second optical coupler 92 and returned as a loopback signal to the optical fiber transmission path 8.

The coupling attenuation of the first optical coupler 91 and the second optical coupler 92 is 10 dB; when the attenuation given by the first attenuator is set to 25 dB, the optical signal propagated through the optical fiber transmission path 7 is attenuated by 45 dB before it is returned as the loopback signal to the optical fiber transmission path 8. The optical signal propagated through the optical fiber transmission path 8 is attenuated also by 45 dB through the second optical coupler 92, the attenuator 93, and the first optical coupler 91 before it is fed back as the loopback signal to the optical fiber transmission path 7.

The system configuration stated above makes it possible to locate a transit section, where a failure of a repeater or optical fiber has taken place, by extracting the monitoring signal from the loopback signal and measuring the intensity thereof. The description herein will use, as the means for extracting the monitoring signal from the loopback signal, a method wherein the coefficient of auto-correlation between the same signal as the monitoring signal, which is superimposed on the transmission signal, and the received loopback signal at the transmitting equipment is determined. FIG. 8 illustrates an example of an experiment result of the intensity waveform of the monitoring signal observed at the receiving equipment. The experiment was intended for an optical amplification relay system which has twelve repeaters installed at about every 85 km and which measures approximately 1000 km in length. In the chart, the axis of ordinate indicates the level of a received loopback signal, i.e. loopback level, and the axis of abscissa indicates the propagation delay, i.e. delay. The side on which the delay is smaller indicates a local station; the side on which the delay is larger indicates a distant station. At this time, distance L to a repeater is given by:

$L = 3 \times 108/\text{Propagation velocity coefficient of optical fiber (about 1.47)} \times \text{Delay}/2$ The waveform reveals the presence of large signal waves, i.e. peaks, at delay points which correspond to the installing locations of the repeaters. The peaks indicate the loopback signal components from the respective repeaters; therefore, a failure in a repeater or optical fiber can be located by continuously measuring or monitoring the levels of the peaks which correspond to the positions of the repeaters, that is, by determining, for instance, the level changes which have taken place from the levels observed immediately after the optical fibers were laid.

For example, the numbers in FIG. 8 assigned to the peaks which correspond to the positions of the repeaters are taken as the repeater numbers. If an optical submarine cable extending between the repeater 8 and the repeater 9 is broken during fishing or the like, then no loopback signal is returned from the repeater 9; therefore, it is found that a failure has taken place somewhere following the optical fiber connected to the repeater 8. If the same measurement is performed at a distant terminal station, then the loopback signal is returned from the repeater 9 but no loopback signal is given from the repeater 8. Thus, it can be found that the optical fiber laid between the repeater 8 and the repeater 9 has incurred a failure.

In most optical amplification relay transmission systems, to obtain the best possible transmission characteristics, it is effective to transmit optical signals in a wavelength region wherein the best possible wavelength-to-gain characteristic of the system can be obtained and to propagate the optical signals in a wavelength region wherein the wavelength dispersion characteristic of the system is close to zero. It is difficult, however, to control the wavelength-to-gain characteristic of the system; therefore, it is a common practice to optimally dispose the optical fibers so that the wavelength dispersion characteristic becomes approximately zero in the wavelength region where the best wavelength-to-gain characteristic is obtained. For this reason, the optical signals propagating through the associated lines in the optical amplification relay transmission system have the same wavelength.

Hence, the loopback signals are the optical signals which have the same wavelength as that of the main track signals and the loopback signals become noises for the main track signals. It is necessary, therefore, to adequately attenuate the loopback signals so that they do not adversely affect the regeneration of the signals transmitted through the main track.

Thus, the loopback circuit constituted by 9a through 9n is designed to attenuate the optical signals by approximately 45 dB for the loopback.

This, on the other hand, requires that a weak loopback signal be extracted from a strong main track signal which is transmitted from the associated station and which has the same wavelength when the monitoring signal is extracted from the loopback signal. For this purpose, an apparatus for removing a main track signal shown in FIG. 9 has been proposed by the applicant (see Japanese Patent Laid-Open No. 6-164503).

The apparatus shown in the drawing includes: an optical receiver 51 for converting optical signals into electric signals; amplifier 52 for amplifying the output of the optical receiver 51; a distributing circuit 53 for splitting the output of the amplifier 52 into two signals; an equalizing amplifier 54 for amplifying and waveform-shaping one signal given by the distributing circuit 53; a timing extracting circuit 55 for extracting a timing signal from the output of the equalizing amplifier 54; and an identifying/regenerating circuit 56 for regenerating a main track transmission signal from the output of the equalizing amplifier 54 according to the timing signal supplied by the timing extracting circuit 55.

The apparatus further includes: a low-pass filter 57 to which the other signal given from the distributing circuit 53 is supplied; a phase shifter 58 for adjusting the phase of the output signal from the low-pass filter 57; an attenuator 59 for adjusting the amplitude of the output signal of the phase shifter 58; a low-pass filter 60 to which a regenerated signal, i.e. the output of the identifying and regenerating circuit 56, is supplied; a phase shifter 61 for adjusting the phase of the output signal of the low-pass filter 60; an attenuator 62 for adjusting the amplitude of the output signal of the phase shifter 61; a differential synthesizer 63 for differentially combining the output of the attenuator 59 and the output of the attenuator 62; and a band-pass filter 64 for extracting a monitoring signal from the output of the differential synthesizer 63.

In the terminal station receiving equipment thus configured, the main track signal, over which a loopback signal containing the monitoring signal is superimposed and which is supplied through the optical fiber transmission path, is converted into an electric signal by the optical receiver 51 and amplified by the amplifier 52, then it is split into two signals by the distributing circuit 53. The main track transmission signal is regenerated from one of the two signals by using the equalizing amplifier 54, the timing extracting circuit 55, and the identifying and regenerating circuit 56. In the regenerating process of the main track transmission signal, the weak loopback signal which is superimposed on the main track signal and which contains the monitoring signal is removed.

The regenerated output of the identifying and regenerating circuit 56 and the regenerated output of the timing extracting circuit 55 are supplied to regular communication service. The other output signal of the distributing circuit 53 is supplied to one input of the differential synthesizer 63 via the low-pass filter 57, the phase shifter 58, and the attenuator 59. The regenerated main track transmission signal which is the output of the identifying and regenerating circuit 56 is also supplied to the low-pass filter 60 and supplied to the other input of the differential synthesizer 63 via the phase shifter 61 and the attenuator 62.

Hence, the output of the differential synthesizer 63 is the signal resulting from the difference only between the loopback signal and main track transmission signal component supplied from the attenuator 59 and the regenerated main track transmission signal component which is supplied from the attenuator 62. Thus, the main track transmission signal component is removed and only the loopback signal component is output. A loopback signal with a good SN ratio can be extracted by taking out the output signal through the band-pass filter 64.

The optical loopback method stated above features the simple repeater configuration and permits easy line monitoring. The loopback signal, however, is extremely weaker than the main track signal and both the loopback signal and the main track signal are the optical signals which have the same wavelength. This presents a problem in that the receiving equipment at the terminal station requires an expensive main track signal removing device with a complicated configuration as shown in FIG. 9.

Further, even with the complicated configuration, repeated measurement and adding up and averaging by arithmetic operation are required because the detected loopback signal is very weak, thus posing a problem in that at least about two hours are required for detecting the point of failure. Especially when an optical frequency multiplex method whereby many optical signals are multiplexed and transmitted through a single optical fiber in order to increase transmission capacity, it is necessary to install the main track signal removing unit for every wavelength slot, resulting in an extremely complicated configuration of the receiving equipment at the terminal station.

SUMMARY OF THE INVENTION

Accordingly, it is an object of the present invention to provide a monitoring method and a monitoring apparatus in an optical amplification relay transmission system which enable quick detection of a point of failure with a simple configuration without causing deterioration in the transmission characteristics of a main track signal.

To this end, according to the present invention, there is provided a line monitoring method wherein: at every predetermined distance of an optical fiber which constitutes at least a pair of up-stream and down-stream transmission paths, optical repeating means for amplifying an optical signal which propagates through the optical fiber is provided; in the optical repeating means, an optical signal which propagates through one of the transmission paths is returned as a loopback signal, which has been attenuated by a predetermined amount, to the other transmission path; the optical signal which is sent out to one transmission path from one terminal station transmitting equipment in terminal station systems provided at both ends of the transmission path is set at a different frequency from that of the optical signal which is sent out to the other transmission path from the other terminal station transmitting equipment; and each terminal station receiving equipment extracts the loopback signal which is supplied through the transmission path and returned by the repeating means in order to monitor the state of the transmission path.

In the aforesaid line monitoring method, a monitoring signal is superimposed on the optical signal which is sent out to the transmission path and the state of the transmission path is monitored by detecting the monitoring signal;

- a plurality of the optical signals sent out to the transmission paths are multiplexed in optical frequency;
- the monitoring signal is superimposed on one optical signal on at least the up-stream transmission path and also superimposed on one optical signal of at least the down-stream transmission path;
- the wavelength of the optical signal propagating through one of the transmission paths is shifted from that of the optical signal propagating through the other transmission path to provide a wavelength interval so that they can be separated from each other by optical wave filtering means; and
- a different carrier frequency of the monitoring signal superimposed on the optical signal is set for each optical signal which is sent out to the up-stream transmission path or the down-stream transmission path.

A line monitoring apparatus which embodies the line monitoring method according to the present invention is equipped with a transmission path constituted by at least a pair of up-stream and down-stream optical fibers; an optical repeater which has an optical amplifier for amplifying an optical signal propagating through the optical fibers and which is installed at every predetermined distance of the transmission path; and terminal station systems constituted by terminal station transmitting equipment and terminal station receiving equipment which are provided at both ends of the transmission path; wherein one of the terminal station transmitting equipment sends out the optical signal as a main track signal to the up-stream transmission path whereas the other terminal station transmitting equipment sends out the optical signal, which has a different wavelength from that of the optical signal transmitted by one of the terminal station transmitting equipment, as the main track signal to the down-stream transmission path; the terminal station receiving equipment has a monitoring unit for monitoring the state of the transmission path by extracting a loopback signal which is returned in the optical repeater from the optical signal propagated through the transmission path; and the optical repeater is provided with an optical loopback circuit for generating the loopback signal, which circuit is designed to attenuate the optical signal propagating through one of the transmission paths by a predetermined level before returning it to the other transmission path.

In the line monitoring apparatus, the monitoring signal is superimposed on the optical signal sent out to the transmission path, so that the monitoring apparatus monitors the state of the transmission path by detecting the monitoring signal;

- a different carrier frequency of the monitoring signal superimposed on the optical signal is set for each optical signal which is sent out to the up-stream transmission path or the down-stream transmission path;
- the terminal station transmitting equipment is equipped with at least one optical transmitter so that at least one optical signal sent out to the up-stream transmission path or the down-stream transmission path is multiplexed in optical frequency;
- at least one of the optical transmitters in the terminal station transmitting equipment superimposes the monitoring signal onto the optical signal and sends it out to the transmission path; and
- the wavelength of the optical signal transmitted from one of the terminal station transmitting equipments is shifted from that of the optical signal transmitted from the other terminal station transmitting equipment to provide a wavelength interval so that they can be separated from each other by an optical band-pass filter.

According to the present invention, the optical signals used for the up-stream line and the down-stream line, respectively, have different wavelengths, so that the wavelength of the loopback signal does not overlap the wavelength of the associated main track signal. Hence, the loopback signal does not affect the associated main track signal and the monitoring signal can be detected by the simple configuration using the wave dividing function. Moreover, since the loopback signal does not interfere with the main track signal, the level of the loopback signal can be increased from that in the past, thus enabling quicker detection of a point where a failure has taken place. The different wavelengths of the optical signals for the up-stream line and the down-stream line, respectively, do not always ensure the best transmission characteristics; however, the wavelength interval between the two wavelengths is small enough so that the deterioration in the SN ratio is negligible, causing no problem in actual applications.

BRIEF DESCRIPTION OF THE DRAWINGS

FIGS. 2(a) and 2(b) are diagrams illustrating the arrangement of channel slots when the present invention is applied to an optical frequency multiplexing method;

FIGS. 6(a)–6(c) are diagrams showing examples of application of the channel slots and the mixture of four photons;

DESCRIPTION OF THE PREFERRED EMBODIMENTS

The present invention will be described with reference to FIG. 1 through FIG. 6 illustrative of the configuration of an embodiment of a line monitoring apparatus which embodies the line monitoring method in an optical amplification relay transmission system in accordance with the present invention.

Figure 1:
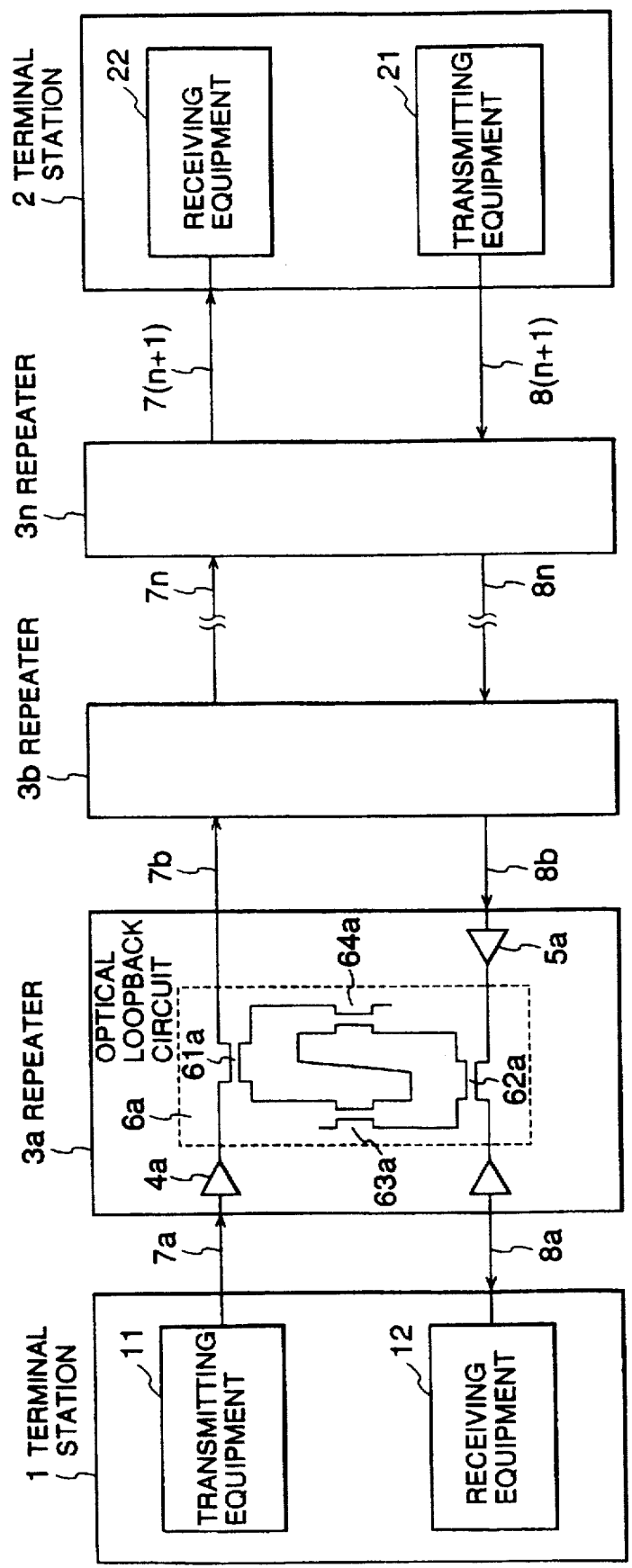
FIG. 1 is an entire configuration diagram showing an optical amplification relay transmission system to which the present invention is applied.

FIG. 1 is the entire configuration diagram showing an optical amplification relay transmission system to which the present invention is applied.

The system shown in FIG. 1 includes terminal stations 1 and 2, transmitting equipment 11 and 21 in the terminal stations 1 and 2, receiving equipment 12 and 22 in the terminal stations 1 and 2, and optical repeaters 3a through 3n which all have the same configuration. In the drawing, therefore, the internal configuration of only the optical repeater 3a is shown.

The optical repeaters 3a through 3n have optical amplifiers 4a through 4n for an up-stream line, optical amplifiers 5a through 5n for a down-stream line, and optical loopback circuits 6a through 6n between the up-stream line and the down-stream line.

The optical loopback circuits 6a through 6n are respectively connected to first branching/coupling optical couplers 61a through 61n installed at the output side of the optical amplifiers 4a through 4n for the up-stream line, second branching/coupling optical couplers 62a through 62n installed at the output side of the optical amplifiers 5a through 5n for the down-stream line, and optical couplers 63a through 64n for the intermediate connection for feeding back a main track signal and back scattering light via an associated line. Reference numerals 7a through 7(n+1) and 8a through 8(n+1) denote optical fiber transmission paths constituting the up-stream line and the down-stream line, respectively.

In the optical amplification relay transmission system thus configured, the terminal station transmitting equipments 11 and 21 superimpose a monitoring signal on the main track signal and transmit them, the details of which will be discussed later in conjunction with FIG. 3. An M-series PN signal is employed for the monitoring signal. The carrier wave of the monitoring signal is phase-modulated using the PN signal, then the phase-modulated wave is amplification-modulated using the main track signal, thereby superimposing the monitoring signal on the main track signal before they are sent out to the transmission path 7a or 8(n+1).

In the respective optical repeaters 3a through 3n, the up-stream main track signal and down-stream main track signal which are supplied through the up-stream optical fiber transmission paths 7a through 7n and the optical fiber transmission paths 8b through 8(n+1), respectively, are amplified as optical signals through the optical amplifiers 4a through 4n for the up-stream line and the optical amplifiers 5a through 5n for the down-stream line.

In this case, the outputs of the optical amplifiers 4a through 4n for the up-stream line are sent out to the up-stream optical fiber transmission paths 7b through 7(n+1) via the first branching/coupling optical couplers 61a through 61n and a part thereof is branched and supplied to the optical couplers 64a through 64n for the intermediate connection. A part of the up-stream main track signal supplied to the optical couplers 64a through 64n for the intermediate connection is supplied to the second branching/coupling optical couplers 62a through 62n before it is coupled to the down-stream optical fiber transmission paths 8a through 8n. At this time, a part of the returned up-stream main track signal is set so that it is attenuated by a total of approximately 45 dB, namely, about 10 dB by the first branching/coupling optical couplers 61a through 61n, about 25 dB by the optical couplers 64a through 64n for the intermediate connection, and about 10 dB by the second branching/coupling optical couplers 62a through 62n.

Further, a part of the back scattering light of the up-stream main track signal which occurs in the up-stream optical fiber transmission paths 7b through 7(n+1) passes through the first branching/coupling optical couplers 61a through 61n, the optical couplers 63a through 63n for the intermediate connection, and the optical couplers 64a through 64n for the intermediate connection before it is supplied to the second branching/coupling optical couplers 62a through 62n and coupled to the down-stream optical fiber transmission paths 8a through 8n. At this time, the back scattering light of the returned up-stream main track signal is attenuated, for example, by a total of about 20 dB only, namely, by about 10 db by the first branching/coupling optical couplers 61a through 61n and by about 10 dB by the second branching/coupling optical couplers 62a through 62n.

Thus, the up-stream main track signal, which contains the monitoring signal, and the back scattering light thereof are fed back to the terminal station 1 as the loopback signal together with the down-stream main track signal. Just like the aforesaid up-stream main track signal, the down-stream main track signal is fed back to the terminal station 2 together with the up-stream main track signal.

Receiving the loopback signal from the repeater makes it possible to locate a failure in a relay section constituted by the repeater and the optical fiber. In the case of a failure with the optical fiber, however, it is impossible to accurately locate the position of the failure. Therefore, the route of the aforesaid back scattering light is set, so that the point of failure of the optical fiber in the relay section can be detected with high accuracy. (For more details, see Japanese Patent Laid-Open No. 5-336042.)

The receiving equipment 12, 22 of the terminal stations 1, 2 separate the main track transmission signal and the loop signal from the received main track signal and regenerate the main track transmission signal which is then supplied for communication service; they also performs the correlation detection of the PN signal which is the monitoring signal contained in the loopback signal and also detect the operating states of the respective optical repeaters 3a through 3n and the point of failure of the optical fiber transmitting path by making use of the fact that the transmitting distance differs for each loopback signal from the respective optical repeaters 3a through 3n. The details thereof will be discussed later.

FIG. 2 shows the arrangements of the channel slots of the up-stream main track signal and the down-stream main track signal according to the present invention; (a) shows the arrangement of the channel slots of the up-stream main track signal, and (b) shows the arrangement of the channel slots of the down-stream main track signal. The axis of abscissa indicates the wavelength. The embodiment shows an example wherein the number of channel slots, k, is 8; in other words, the up-stream and down-stream main tracks respectively have eight channel slots.

The channel slots are arranged at wavelength intervals (( as illustrated and they are arranged alternately so that the up-stream and down-stream channel slots do not overlap each other.

Figure 3A:
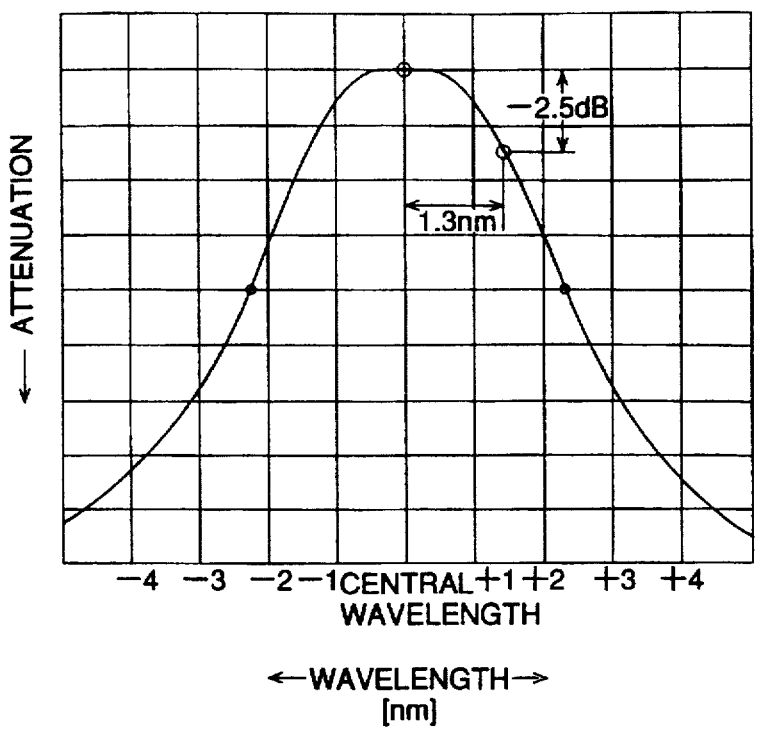
FIGS. 3a and 3b are diagrams illustrating examples of the characteristics of an optical band-pass filter for separating an optical signal transmitted from a local station transmitting equipment and an optical signal transmitted from associated transmitting equipment and the characteristics of an optical band-pass filter for separating the channel slots in receiving equipment.

The wavelength interval stated above will be described in more detail. When one-wavelength optical signals are transmitted through the up-stream and down-stream transmitting paths and when the optical signal sent out from the local station transmitting equipment passes through an optical band-pass filter, if the power of the transmitted light at the wavelength of the optical signal sent out from the associated transmitting equipment has been attenuated by about −7.5 dB or more in relation to the power of the transmitted light at the central wavelength of the optical signal, then the optical signals can be separated by a regular optical band-pass filter before reception. Specifically, in the case of the optical band-pass filter which has the attenuation characteristic as shown in FIG. 3(a), the wavelength of the optical signal sent out from the local station transmitting equipment should be shifted approximately 1.3 nm from the wavelength of the optical signal sent out from the associated transmitting equipment.

Figure 3B:
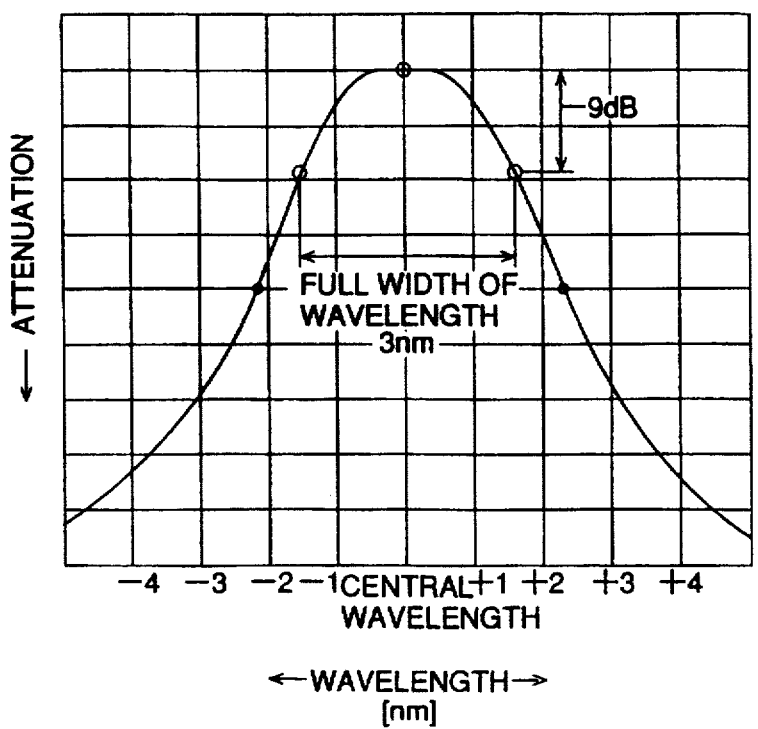

When a plurality of optical signals are transmitted through the up-stream and down-stream transmitting paths, if the power of the transmitted light at the wavelength of an adjoining channel slot has been attenuated by about −9 dB or more in relation to the power of the transmitted light at the central wavelength of a certain channel slot, then the wavelength between the adjoining channel slots of the up-stream main track signal or the wavelength between the adjoining channel slots of a down-stream main track signal hardly interfere with each other. This means that when the optical band-pass filter for separating the channel slots at the receiving equipment has an attenuation characteristic as shown in FIG. 3(b), a separation of approximately 3 nm should be provided for the wavelength of the optical signal sent out from the local station transmitting equipment and the wavelength between the adjacent channel slots.

Thus, wavelength interval (( depends on the characteristics of the optical band-pass filter. The use of an optical band-pass filter which has a sharp attenuation characteristic curve reduces wavelength interval ((.

Figure 4:
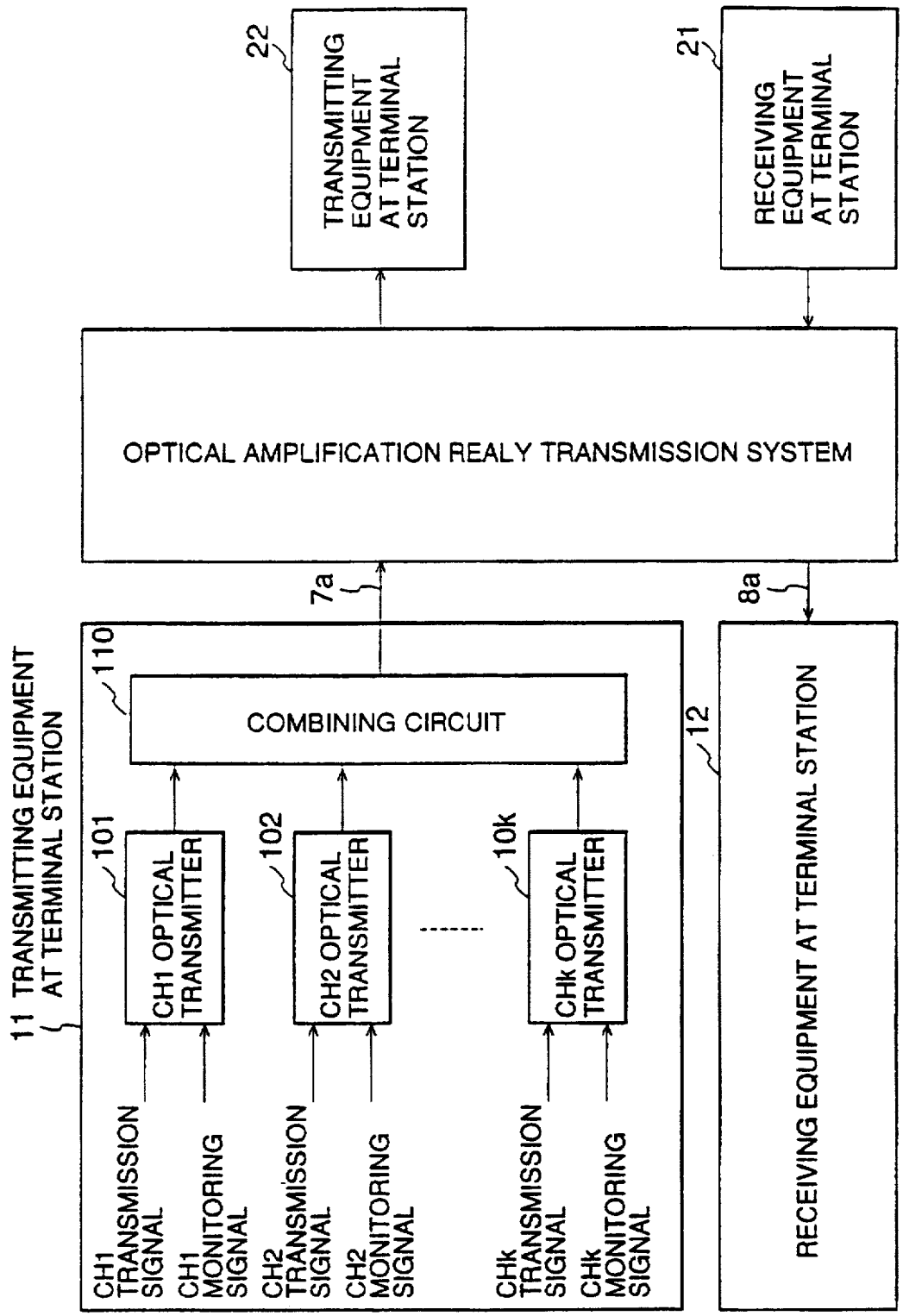
FIG. 4 is a diagram showing the configuration of terminal station transmitting equipment employed for a line monitoring apparatus in accordance with the present invention.

FIG. 4 shows the configuration of the transmitting equipments 11 and 21 at the terminal stations according to the present invention. The transmitting equipments 11 and 21 at the terminal stations share the same configuration; therefore, FIG. 4 shows the detailed configuration of only the terminal station transmitting equipment 11 for the up-stream line.

Optical transmitters 101 through 10k are provided for channels CH1 through CHk; they transmit optical signals of the wavelengths of the respective channel slots, the optical signals being composed of entered transmission signals on which the monitoring signal is superimposed. A combining circuit 110 combines the line signals issued from the respective optical transmitters 101 through 10k. The output of the combining circuit 110 is arranged as illustrated in FIG. 2(a) and supplied to the optical fiber transmission path 7a which constitutes the up-stream line.

The respective optical transmitters 101 through 10k in the terminal station transmitting equipment 11 thus configured receive the monitoring signals from corresponding PN signal generators which are not illustrated. The monitoring signals are used to subject the light of the wavelengths of the assigned channel slots, which are generated by optical carrier wave generators, to shallow intensity modulation. The intensity-modulated light is subjected to further intensity modulation by corresponding transmission signals before they are supplied to the combining circuit 110. The combining circuit 110 combines the optical signals of the wavelengths corresponding to the channel slots output from the respective optical transmitters 101 through 10k, then sends out the combined signal to the single optical fiber transmission path 7a.

Figure 5:
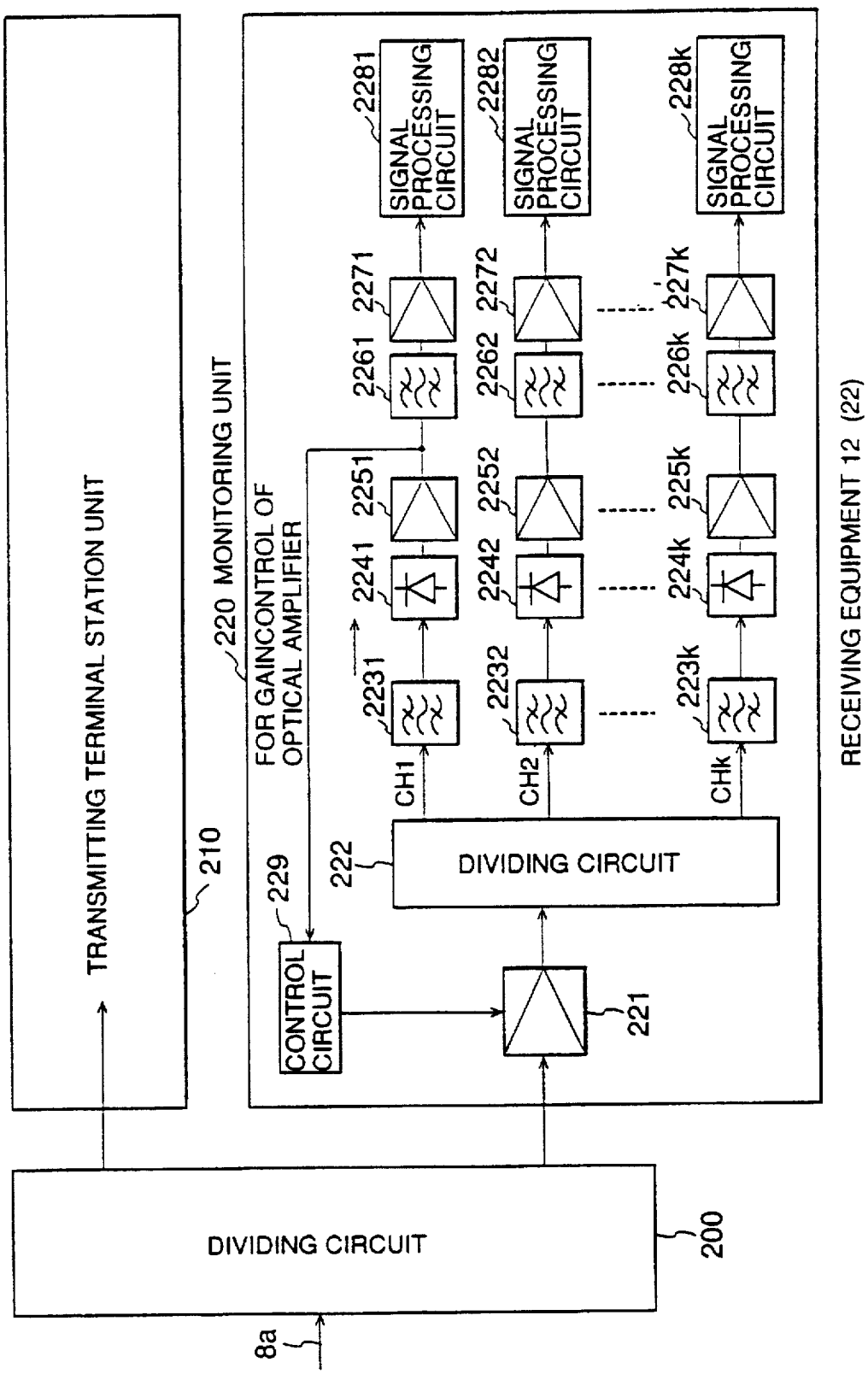
FIG. 5 is a diagram showing the configuration of terminal station receiving equipment employed for a line monitoring apparatus in accordance with the present invention.
Figure 7A:
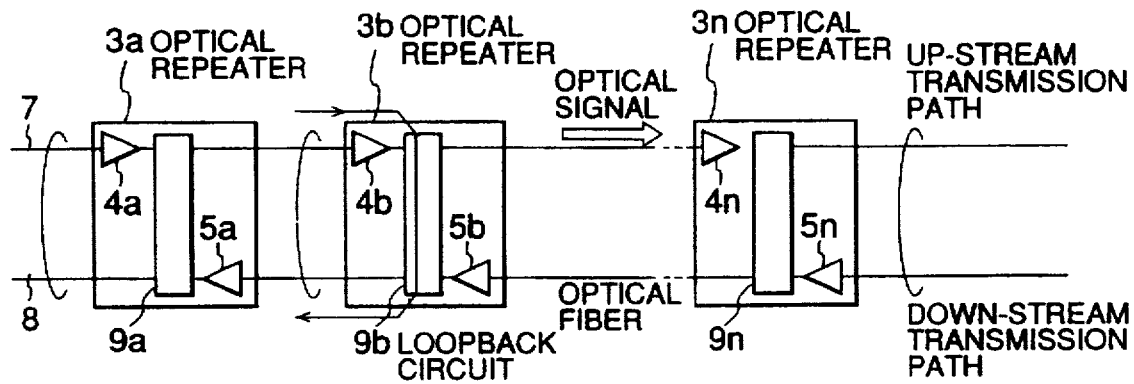
FIGS. 7a and 7b are diagrams showing examples of the configuration of an optical amplification relay system to which a conventional optical loopback method is applied.
Figure 7B:
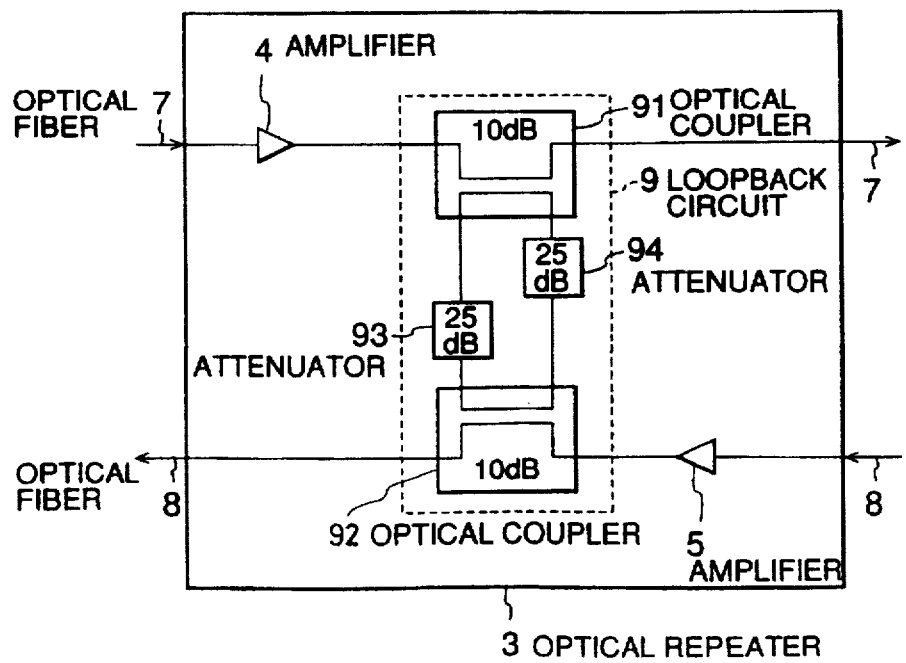
Figure 8:
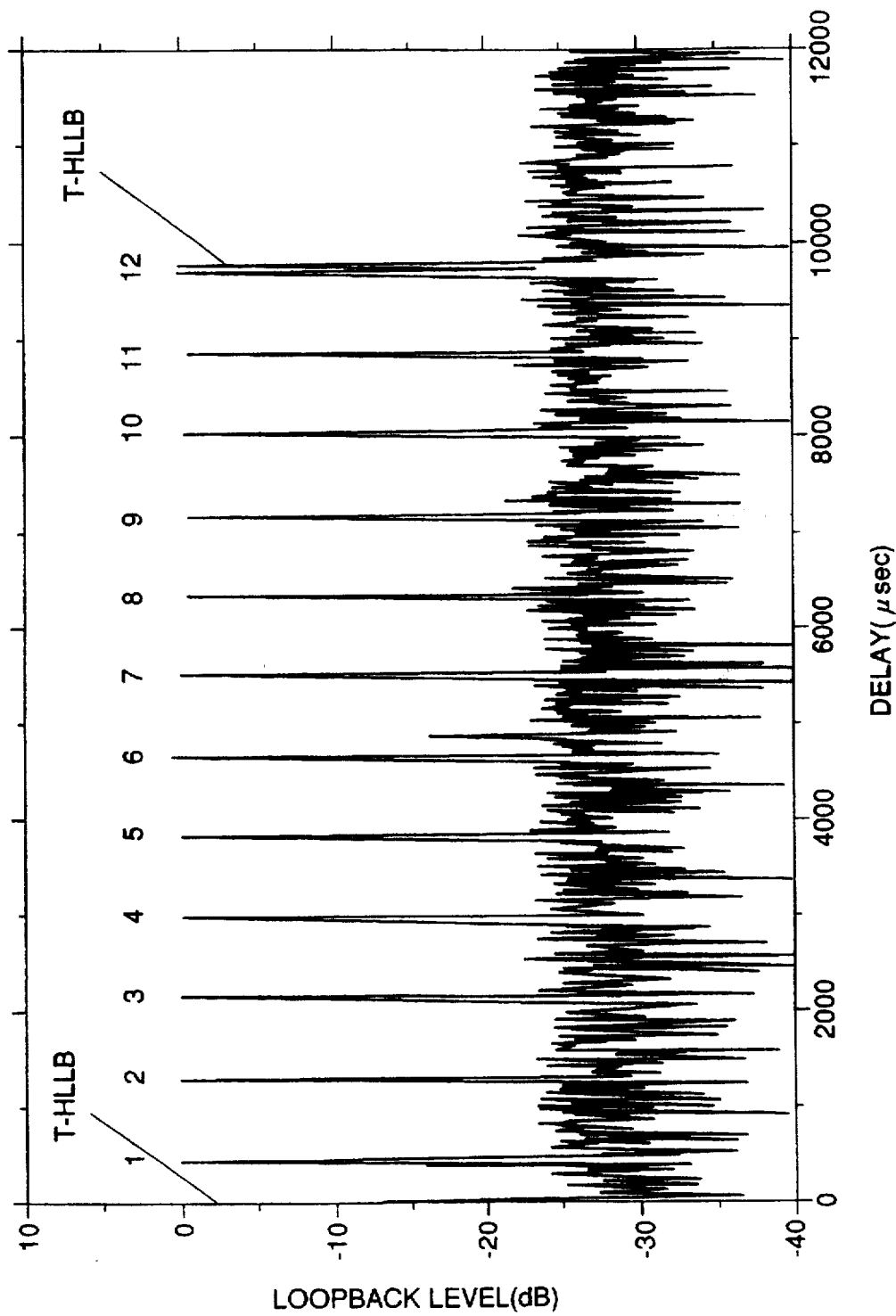
FIG. 8 is a diagram showing an example of waveform illustrative of the intensity of a monitoring signal observed by the optical loopback method.
Figure 9:
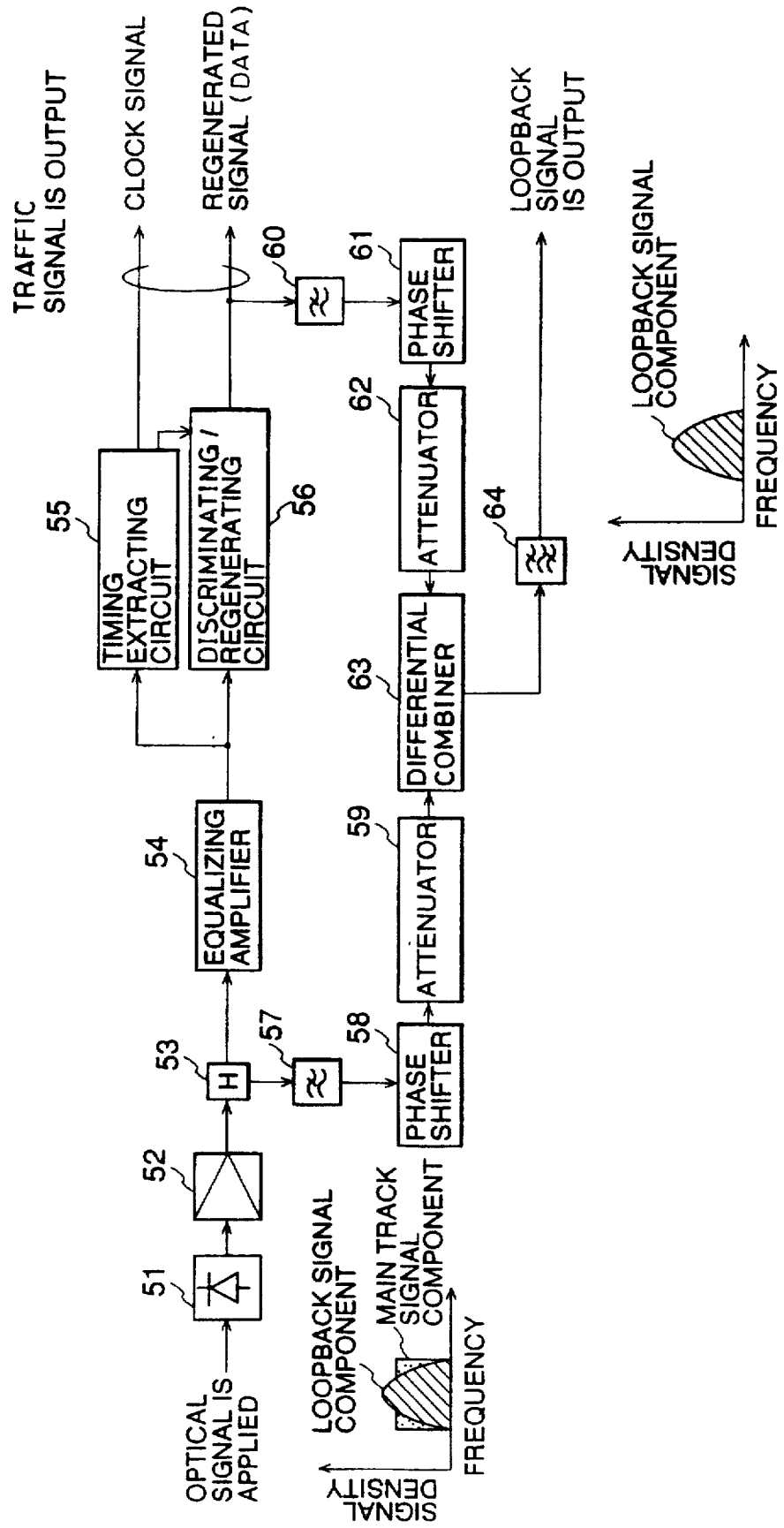
FIG. 9 is a diagram showing the configuration of terminal station receiving equipment employed in a conventional line monitoring method.

FIG. 5 shows the configuration of the terminal station receiving equipments 12 and 22 in accordance with the present invention. The receiving equipments 12 and 22 at the terminal stations share the same configuration; therefore, FIG. 5 shows the detailed configuration of only the terminal station receiving equipment 12 for the down-stream line.

The receiving equipment 12 in the drawing includes: a dividing circuit 200 for branching an optical signal received through the optical fiber transmission path 8a into two or more signals; a transmission terminal station unit 210 for receiving down-stream main track signals out of the branched optical signals and regenerating them for the respective channel slots to supply them for communication service; and a monitoring unit 220 for receiving the loopback signals out of the branched optical signals to detect the point of a failure of a repeater or transmission path.

The receiving equipment 12 further includes: an optical amplifier 221 for amplifying the loopback signal to a predetermined level; a dividing circuit 222 for branching the output of the optical amplifier 221 for each channel slot; band-pass filters 2231 through 223k which correspond to the wavelengths of the channel slots for extracting the channel slot outputs from the dividing circuit 222; optical receivers 2241 through 224k which are provided for the respective channel slots for converting the output optical signals of the respective band-pass filters to electric signals; amplifiers 2251 through 225k for amplifying the output electric signals of the optical receivers 2241 through 224k; band-pass filters 2261 through 226k for taking out the monitoring signal components superimposed on the loopback signals from the output signals of the amplifiers 2251 through 225k; amplifiers 2271 through 227k for amplifying the outputs of the band-pass filters 2261 through 226k; signal processing circuits 2281 through 228k provided for the respective channel slots to which the outputs of the amplifiers 2271 through 227k are supplied; and a control circuit 229 for controlling the gain of the optical amplifier 221 in accordance with the output of the amplifier 2251.

In such a configuration, optical signals propagating through the optical fiber transmission path 8a constituting the down-stream line permit easy separation and extraction of the loopback signal from the down-stream main track signal by the band-pass filters 2231 through 223k since the channel slots of the down-stream main track signals do not overlap the channel slots of the loopback signals returned from the respective repeaters 3a through 3n.

The separated down-stream main track signals are indicated by the channel slots CH1' through CHk' arranged as illustrated in FIG. 2(b) and they are converted to electric signals in the transmission terminal station unit 210 and supplied for communication service. The loopback signals have the same wavelength arrangement as that of the up-stream main track signals CH1 through CHk illustrated in FIG. 2(a); they are amplified by the optical amplifier 221, then separated for the respective channel slots CH1 through CHk by the dividing circuit 222.

The loopback signals for the respective channel slots pass through the optical filters 2231 through 223k, and are then converted to electric signals by the optical receivers 2241 through 224k and amplified by the amplifiers 2251 through 225k. The loopback signals corresponding to the respective channel slots which are output from the respective amplifiers 2251 through 225k are supplied to the band-pass filters 2261 through 226k and the superimposed monitoring signal components are taken out. The outputs of the band-pass filters 2261 through 226k are further amplified by the amplifiers 2271 through 227k before they are supplied to the respective signal processing circuits 2281 through 228k. The output of the amplifier 2251 is supplied to the control circuit 229, and the gain of the optical amplifier 221 is controlled so that the level of the light applied to the optical receiver 2241 becomes constant.

In the signal processing circuits 2281 through 228k provided for the respective channel slots, the correlation is detected between the monitoring signals returned from the respective repeaters 3a through 3n for the respective channel slots and the monitoring signals supplied to the optical transmitters 101 through 10k shown in FIG. 4, thereby enabling the detection of the operating states of the repeaters and the point of a failure of the optical fiber transmitting paths.

The aforesaid detection is possible because the monitoring signals are pseudo-irregular series signals such as M-series PN signals. This permits the comparison between channels in the transmission characteristics.

The monitoring unit according to the present invention is equipped with the receiving circuits for the k channels; however, it is obvious that the receiving circuit for just one channel can cover all channels by changing the wavelength of the optical filter 223.

Thus, according to the present invention, since the received loopback signal is the optical signal of the channel slot which has a different wavelength from the associated main track signal, returning the loopback signal with a higher level does not cause the associated main track signal to become a noise to the loopback signal. This leads to an improved receiving SN ratio; therefore, the point of failure can be quickly located and the monitoring signals can be easily taken out simply by using a band-pass filter or other wavelength separator without the need of a complicated main track signal removing unit.

In the embodiment described above, it is not necessary to use all the channel slots to transmit the optical signals; alternatively, the four channel slots with the black vertical bars illustrated in FIG. 6(a) may be used for the channel slots for transmitting the optical signals in the up-stream line and the four channel slots with the black vertical bars shown in FIG. 6(b) may be used for the channel slots for transmitting the optical signals in the down-stream line. In this case, as illustrated in FIG. 6(c), the transmission characteristics of the adjacent channel slots which are away by the same wavelength interval between A and B are deteriorated by the optical signal component comprised of the mixture of four photons from A and B. Likewise, the transmission characteristics of the channel slots which are away by the same wavelength interval between C and D as illustrated are deteriorated by the optical signal component comprised of the mixture of four photons from C and D. Likewise, the transmission characteristics of the channel slots adjacent to D are deteriorated due to the optical signal components comprised of the mixture of four photons from B and C.

Thus, increasing the number of channel slots for transmitting optical signals accordingly deteriorates the transmission characteristics. Therefore, it is not necessary to use all the channel slots; one channel slot or every other channel slot or any channel slots at random may be used.

The same applies to the channel slots for superimposing the monitoring signals; the monitoring signals may be superimposed on every channel slot, however, as an alternative, the monitoring signals may be superimposed on a single channel slot, every other channel slot, or channel slots at random.

The embodiment relates to the case where an optical frequency multiplexing system is used; however, it is obvious that the same configuration can be applied for a case where the optical amplification relay transmission system uses only one wave.

According to the present invention, there is no overlap of wavelengths of the main track signals on the associated optical transmission paths. This prevents the loopback signals from deteriorating the transmission characteristics of the main track signals of the associated optical transmission signals, thus allowing the loopback level of the loopback signals to be increased. Hence, the point of a failure can be quickly detected and the monitoring signals can be easily taken out simply by using a wavelength separating circuit including an optical band-pass filter.

Thus, despite the simpler configuration of the receiving equipment at the terminal station, the monitoring signals can be received with a better SN ratio and the point of failure can be quickly located, permitting quick recovery from the a failure.

As described above, the present invention provides very significant advantages in practical applications.

What is claimed is:

1. A line monitoring method wherein:
   at every predetermined distance of an optical fibre which constitutes at least a pair of upstream and downstream transmission paths there are provided optical repeating means for amplifying an optical signal which propagates through said fibre:
   in each of said optical repeating means, an optical signal which propagates through one of said transmission paths is returned as a loopback signal, which has been attenuated by a prescribed amount, to said other transmission path;
   in receiving terminal station equipment in terminal station apparatus provided at both ends of said transmission paths the condition of said transmission paths is monitored by extracting said returned loopback signal from an optical signal which is propagated along said transmission paths and detecting the level of the loopback signal which has been extracted; and
   in transmitting terminal station equipment in said terminal station apparatus provided at both ends of said transmission paths the wavelength of an optical signal which is sent out to one of said transmission paths from one of said transmitting terminal station equipments in said terminal station apparatuses is different from the wavelength of an optical signal which is sent out to the other of said transmission paths from the other of said transmitting terminal station equipments.

2. A line monitoring method according to claim 1 wherein a plurality of a optical signals are sent out to said transmission paths and multiplexed in optical frequency.

3. A line monitoring method according to claim 1 wherein the state of each transmission path is monitored by superimposing a monitoring signal on the optical signal which is sent out to said transmission path and detecting the level of said monitoring signal in said returned loopback signal.

4. A line monitoring method according to claim 3 wherein said monitoring signal is superimposed on at least one of a plurality of multiplexed optical signals sent out to the upstream transmission path and is superimposed on at least one of a plurality of multiplexed optical signals sent out to the downstream transmission path.

5. A line monitoring method according to any one of claims 1 to 4 wherein an optical signal that is propagated along one of said transmission paths and an optical signal that is propagated along the other of said transmission paths are offset in wavelength from one another by a wavelength interval sufficient to permit said optical signals to be mutually separated by optical wave filtering means.

6. A line monitoring method according to claim 3 or 4 wherein the carrier frequency of the monitoring signal that is superimposed on an optical signal that is sent out on said upstream transmission path is different from the carrier frequency of the monitoring signal that is superimposed on an optical signal that is sent out on said downstream transmission path.

7. A line monitoring apparatus comprising:

upstream and downstream transmission paths constituted by at least a pair of upstream and downstream optical fibres;

a plurality of optical repeaters each of which has an optical amplifier for amplifying an optical signal propagating through said optical fibres, said optical repeaters being installed respectively at every predetermined distance along said transmission paths;

terminal station apparatus constituted by terminal station transmitting equipment and terminal station receiving equipment respectively provided at both ends of said transmission paths;

one of said terminal station transmitting equipments operative to send out said optical signal to said upstream transmission path as a main track signal;

the other one of said terminal station transmitting equipments operative to send out said optical signal to said downstream transmission path as a main track signal, at a wavelength that is different from the wavelength of said optical signal that is sent out by said one terminal station transmitting equipment to the upstream transmission path as a main track signal;

each of said optical repeaters including an optical loopback circuit for generating a loopback signal which is propagated from one of said transmission paths to the other of said transmission paths and which is attenuated by a predetermined amount before being returned from said one of said transmission paths to the other of said transmission paths; and said terminal station receiving equipment having a monitoring apparatus which monitors the state of said transmission paths by extracting said returned loopback signal and by detecting the level of the extracted loopback signal.

8. A line monitoring apparatus according to claim 7 wherein said monitoring apparatus monitors the state of said transmission paths by superimposing a monitoring signal on the optical signal that is sent out on one of said transmission paths and detecting the level of said monitoring signal in said returned loopback signal.

9. A line monitoring apparatus according to claim 8 wherein a carrier frequency of the monitoring signal which is superimposed on said optical signal is set to be respectively different in the optical signals that are sent out, respectively, on said upstream and downstream transmission paths.

10. A line monitoring apparatus according to any one of claims 7 to 9 wherein said terminal station transmission equipments comprise means for multiplexing optical signals which are sent out on said upstream and downstream transmission paths.

11. A line monitoring apparatus according to any one of claims 7 and 9 wherein the optical signal that is sent by one of said terminal station transmission equipments and the optical signal that is sent by the other of said terminal station transmission equipments are offset in wavelength from one another by a predetermined wavelength interval, said monitoring apparatus including an optical band-pass filter for separating said upstream and downstream optical signals from one another on the basis of said wavelength interval.

* * * * *